(12) United States Patent
Isonaga et al.

(10) Patent No.: US 6,424,268 B1
(45) Date of Patent: Jul. 23, 2002

(54) OCCUPANT DETECTING SYSTEM

(75) Inventors: Kazutomo Isonaga; Tsutomu Fukui; Nobuhiro Koyota; Naoto Ishii; Koichi Kamiji, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/656,381

(22) Filed: Sep. 6, 2000

(30) Foreign Application Priority Data

Sep. 10, 1999 (JP) .......................................... 11-256854
Sep. 10, 1999 (JP) .......................................... 11-256855

(51) Int. Cl.$^7$ .............................................. G08B 21/00
(52) U.S. Cl. ........................ 340/667; 340/438; 340/666
(58) Field of Search .......................... 340/573.1, 573.7, 340/438, 562, 666, 667; 200/85 A, 86 R; 156/269; 280/735; 307/10.1; 180/271, 272, 273

(56) References Cited

U.S. PATENT DOCUMENTS

| | | | | |
|---|---|---|---|---|
| 3,718,791 A | * | 2/1973 | Szablowski | 200/85 A |
| 4,137,116 A | * | 1/1979 | Miller | 156/269 |
| 4,200,777 A | * | 4/1980 | Miller | 200/85 A |
| 4,943,805 A | * | 7/1990 | Dennison | 340/933 |
| 5,301,678 A | * | 4/1994 | Watson et al. | 340/573.1 |
| 6,139,952 A | * | 10/2000 | Furuya et al. | 428/339 |
| 6,158,768 A | * | 12/2000 | Steffens, Jr. et al. | 280/735 |

FOREIGN PATENT DOCUMENTS

JP          11334451          12/1999

* cited by examiner

*Primary Examiner*—Van Thanh Trieu
(74) *Attorney, Agent, or Firm*—Carrier, Blackman & Associates, P.C.; Joseph P. Carrier; William D. Blackman

(57) ABSTRACT

A sheet-shaped sensor body includes a first protective layer formed of a resist paste layer, an antenna film formed of a PET film, a first conductive layer formed of a silver layer, a second conductive layer formed of a carbon layer, a second protective layer formed of a resist paste layer and a hot-melt film, which are laminated one on another in sequence. When the hot-melt film of the sensor body is brought into abutment against a front surface of a wadding previously adhered to a pad of a seat back and is then heat-pressed, the sensor body is fixed firmly and reliably to the wadding by an adhesive force generated by the melted hot-melt film once it again cools and solidified. Thus, the sensor of an occupant detecting system for detecting the physical constitution and the attitude of an occupant sitting on a seat can be fixed easily and reliably to the seat back.

18 Claims, 12 Drawing Sheets

OCCUPANT DETECTING SYSTEM

BACKGROUND OF THE INVENTION

1. Field of the Invention

The present invention relates to an occupant detecting system including at least one sheet-shaped sensor fixed to a seat back to detect the sitting attitude and the physical constitution of an occupant.

2. Description of the Related Art

When a child sitting on a front passenger's seat has fallen asleep and has been inclined toward a door, the following problem is encountered: The head of the child having a low sitting height is disposed very near the front of a side air bag device accommodated in a side of a seat back and for this reason, a side air bag cannot be deployed effectively. Therefore, there is an occupant detecting system already proposed by the present assignee(see Japanese Patent Application Laid-open No. 10-3938), in which a sheet-shaped sensor is embedded between a pad of a seat back and a trim cover covering the surface of the pad to detect the sitting attitude and the physical constitution of an occupant sitting on a front passenger's seat, and when a child is in a sleeping attitude leaning toward a door, the operation of a side air bag device is prohibited.

To mount a sensor to a pad of a seat back, a method sing an adhesive, a method using a double-coated adhesive tape or a method using a double-adhesive applying treatment is conventionally employed.

However, the method for mounting the sensor using the adhesive suffers from a disadvantage that many steps of adhesive application→affixing→pressing→drying are required and as a result, the time required for the mounting operation is prolonged. Also, the quality becomes unstable due to variability in amount and position of adhesive applied. Moreover, when an organic solvent-containing adhesive is used, an undesirable influence to the working environment is feared from the evaporated solvent. When a double-coated adhesive tape or a double-adhesive applying treatment is employed, problems are encountered such as a reduction in adhesive force caused when the sensor is exposed to a high temperature, and reduction durability due to chemicals in the adhesive.

A sensor including a conductive fabric (a fabric plated with a metal) adhered to a base fabric is conventionally used.

However, the conventional sensor suffers the following disadvantages: A special catalyst is required when the fabric is subjected to the metal plating. Moreover, a laser fusing is required for cutting in order to prevent a short-circuit due to fraying of an end edge of the fabric, and further, a surface coating is required for enhancing the corrosion resistance of a metal-plated portion. For this reason, the manufacturing cost is extremely increased.

SUMMARY OF THE INVENTION

Accordingly, it is a first object of the present invention to ensure that a sensor for an occupant detecting system can be fixed easily and reliably to a seat back.

It is a second object of the present invention to provide a sensor for an occupant detecting system at a low cost.

To achieve the above first object, according to a first aspect and feature of the present invention, there is provided an occupant detecting system comprising at least one sheet-shaped sensor fixed to a seat back to detect the sitting attitude and the physical constitution of an occupant, wherein the sensor is welded to the seat back with a hot-melt film interposed therebetween.

With the above arrangement, when the hot-melt film is molten, the sensor can be easily fixed to the seat back by only superposing and heat-pressing the hot-melt film and the sensor to the seat back. Thus, the time required for the fixing operation can be shortened remarkably relative to the conventional mounting method to reduce the cost, and the sensor can be fixed reliably and firmly to the seat back, while eliminating any adverse influence to the working or operating environment.

To achieve the above first object, according to a second aspect and feature of the present invention, in addition to the first feature, the hot-melt film is temporarily welded or bonded in advance to the sensor.

With the above arrangement, the hot-melt film is integrally bonded in advance to the sensor by the temporary welding. Therefore, the operation of superposing the hot-melt film and the sensor to the seat back can be facilitated to prevent the occurrence of a misalignment and to thereby enhance the operability of mounting the sensor.

To achieve the above second object, according to a third aspect and feature of the present invention, there is provided an occupant detecting system comprising at least one sheet-shaped sensor fixed to a seat back to detect the sitting attitude and the physical constitution of an occupant, wherein the sensor comprises a conductive layer printed on a surface of a film material.

With the above arrangement, the sensor comprises the conductive layer printed on the surface of the film material and hence, the manufacturing cost can be reduced remarkably. Also the durability can be enhanced, as compared with the conventional sensor including the conductive fabric adhered to the base fabric. Moreover, the thickness of the sensor can be decreased to alleviate any sense of incompatibility felt by an occupant sitting on the seat back.

To achieve the above second object, according to a fourth aspect and feature of the present invention, in addition to the third feature, the surface of the film material or the conductive layer is covered with a protective layer.

With the above arrangement, by covering the surface of the film material or the conductive layer with the protective layer, the film material or the conductive layer can be protected from an external force and the corrosion resistance thereof can be enhanced.

The above and other objects, features and advantages of the invention will become apparent from the following description of the preferred embodiment taken in conjunction with the accompanying drawings.

BRIEF DESCRIPTION OF THE DRAWINGS

FIGS. 1 to 11 show a first embodiment of the present invention, wherein

FIG. 1 is a plan view of a front passenger's seat in a vehicle provided with a side air bag device;

FIG. 2 is a perspective view of the front passenger's seat;

FIG. 3 is a view taken in the direction of an arrow 3 in FIG. 2;

FIG. 4 is a sectional view taken along a line 4—4 in FIG. 3;

FIG. 5 is an exploded perspective view of the front passenger's seat;

FIG. 6 is an enlarged view of a portion indicated by 6 in FIG. 3;

FIG. 7 is an enlarged sectional view taken along a line 7—7 in FIG. 6;

FIG. 8 is an enlarged view of a portion indicated by 8 in FIG. 3;

FIG. 9 is an enlarged view of a portion indicated by 9 in FIG. 3;

FIG. 10 is a circuit diagram of an electric field output section of the sensor;

FIG. 11 is a diagram for explaining a technique for detecting the physical constitution of an occupant;

DESCRIPTION OF THE PREFERRED EMBODIMENTS

A first embodiment of the present invention will now be described with reference to FIGS. 1 to 11.

Figure 1:
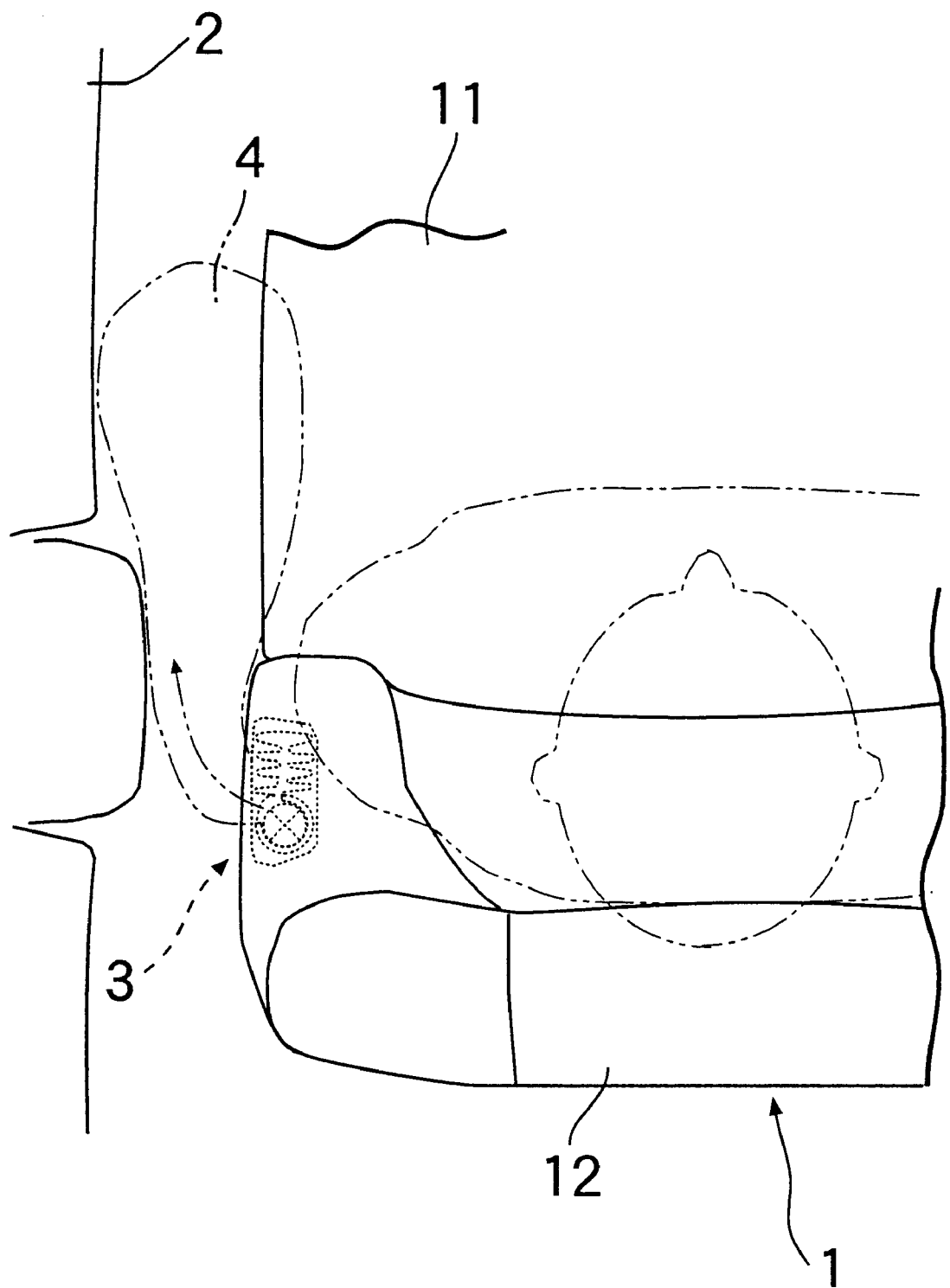
Figure 2:
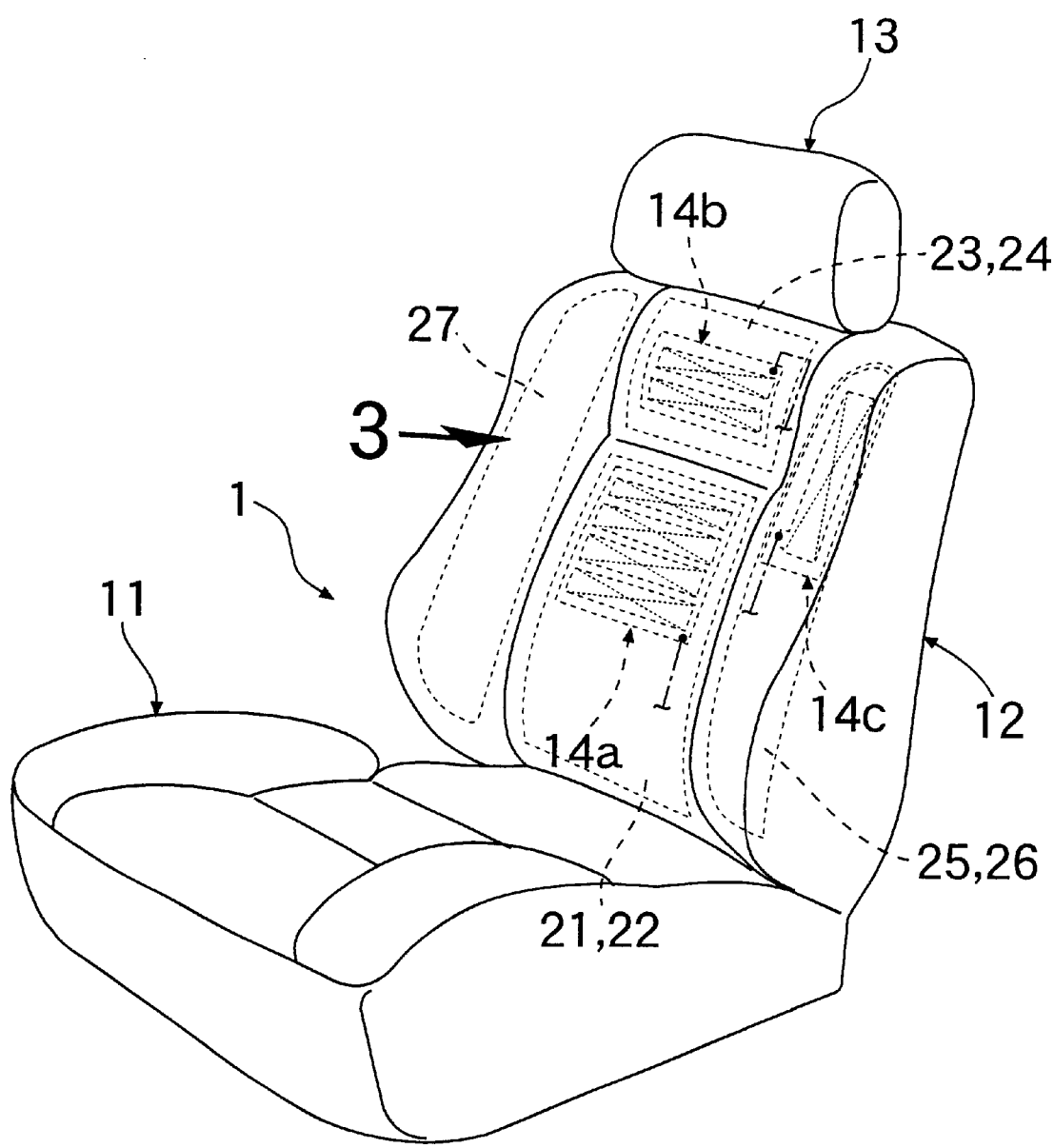
Figure 3:
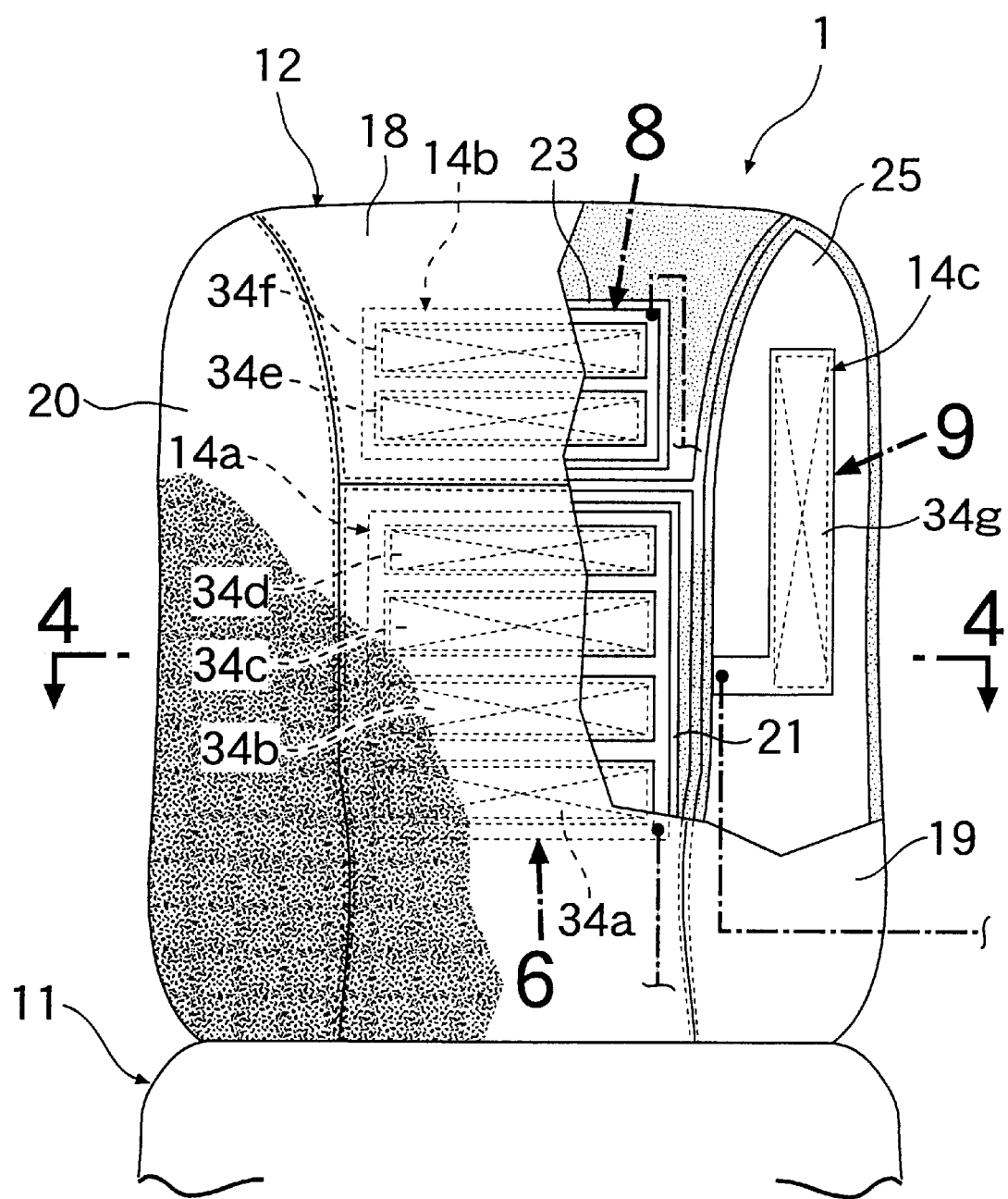
Figure 4:
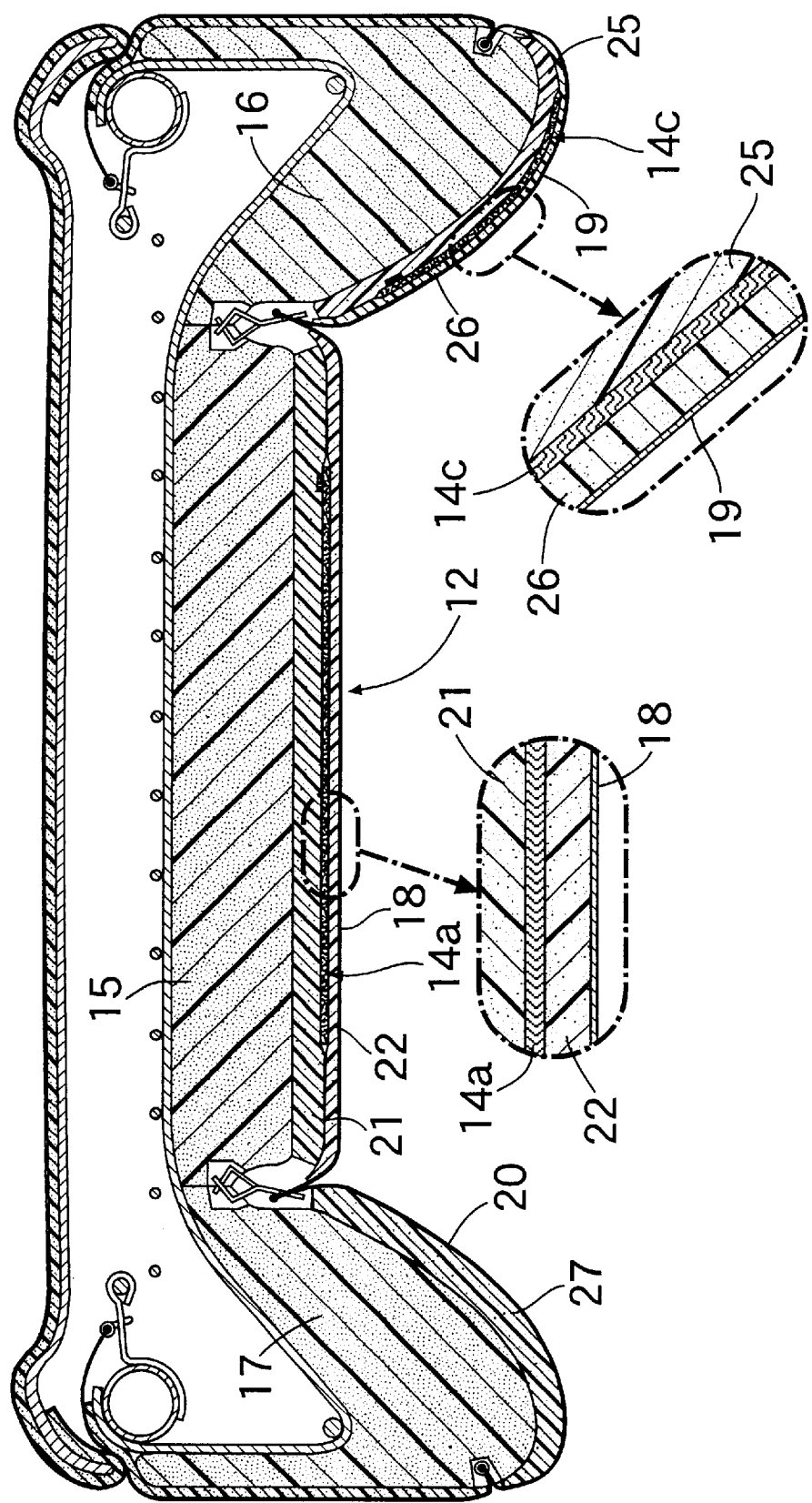
Figure 5:
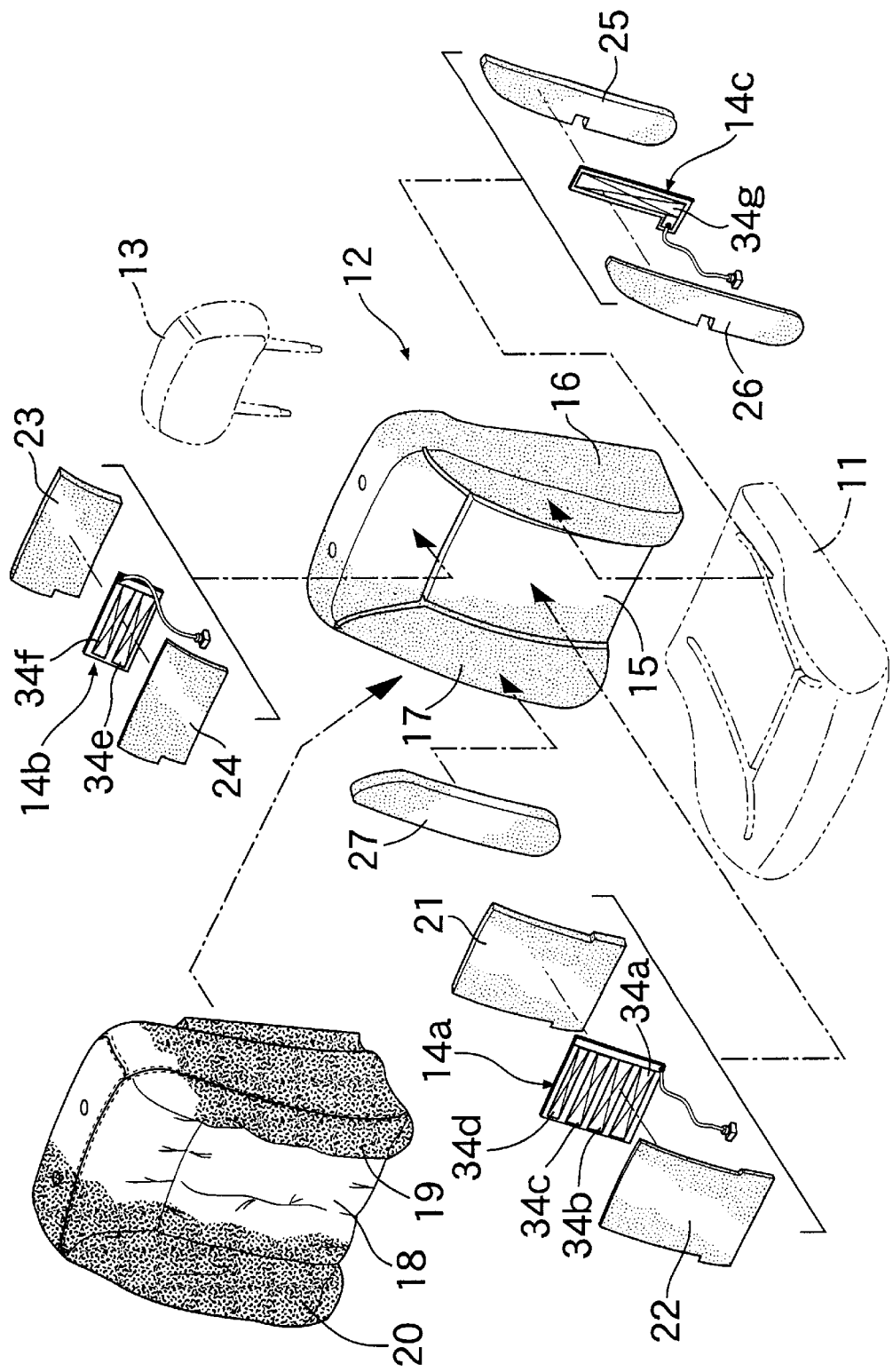

Referring to FIG. 1, a side air bag device 3 for side collision is accommodated in a side of a seat back 12 of a front passenger's seat 1 facing a door 2, so that a side air bag 4 is deployed between the occupant sitting on the front passenger's seat 1 and an inner surface of the door 2 upon side collision of a vehicle. The side air bag device 3 is designed, so that it is not operated when the occupant sitting on the front passenger's seat 1 is a child having a small sitting height and leaning toward the door 2. For this purpose, three sensors 14a, 14b and 14c (see FIGS. 2 to 5) are provided in the front passenger's seat 1 for detecting a state in which the child sitting on the front passenger's seat 1 is leaning toward the door 2.

As shown in FIGS. 2 to 5, the front passenger's seat 1 is comprised of a seat cushion 11, the seat back 12 and a headrest 13. The seat back 12 includes pads 15, 16 and 17 each made of an elastomeric material, and trim covers 18, 19 and 20 which cover front surfaces of the pads 15, 16 and 17, respectively. A first sensor 14a, a second sensor 14b and a third sensor 14c, which are sheet-shaped, and disposed between the front surfaces of the pads 15 and 16 and inner surfaces of the trim covers 18 and 19 covering the front surface of the seat back 12 against which the back of the sitting occupant abuts.

In order to improve the touch upon sitting of the occupant, the first sensor 14a is disposed at the central portion of the seat back 12 in a state in which it is sandwiched between a wadding 21 adhered to the front surface of the central pad 15 of the seat back 12 and a wadding 22 adhered to a rear surface of the trim cover 18. Likewise, the second sensor 14b is disposed at a central and upper portion of the seat back 12 in a state in which it is sandwiched between a wadding 23 adhered to the front surface of the central pad 15 of the seat back 12 and a wadding 24 adhered to the rear surface of the trim cover 18. Further, the third sensor 14c is disposed at a left portion of the seat back 12 in a state in which it is sandwiched between a wadding 25 adhered to the front surface of the left pad 16 of the seat back 12 and a wadding 26 adhered to a rear surface of the trim cover 19. On a right side of the seat back 12 provided with no sensor, a single wadding 27 is adhered to the front surface of the pad 17, with its front surface covered with the trim cover 20.

Figure 6:
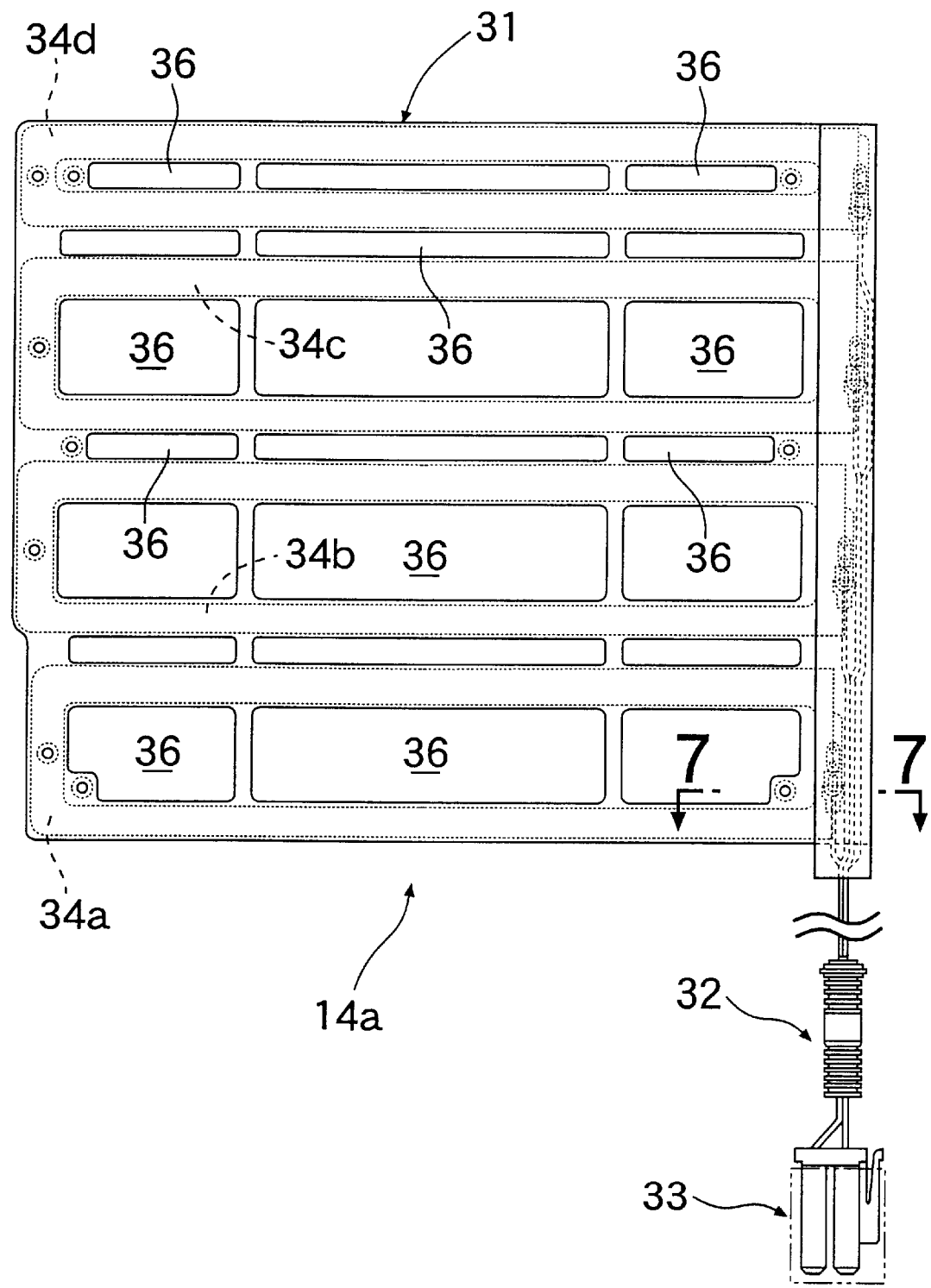

As shown in FIG. 6, the first sensor 14a is comprised of a rectangular sheet-shaped sensor body 31, a harness 32 extending from the sensor body 31, and a connector 33 provided at a tip end of the harness 32. Four laterally extending antenna electrodes 34a, 34b, 34c and 34d are disposed at upper and lower four stages on the sensor body 31, and a large number of openings 36 are defined through central portions of the antenna electrodes 34a, 34b, 34c and 34d and through areas between the adjacent antenna electrodes 34a, 34b, 34c, 34d.

Figure 8:
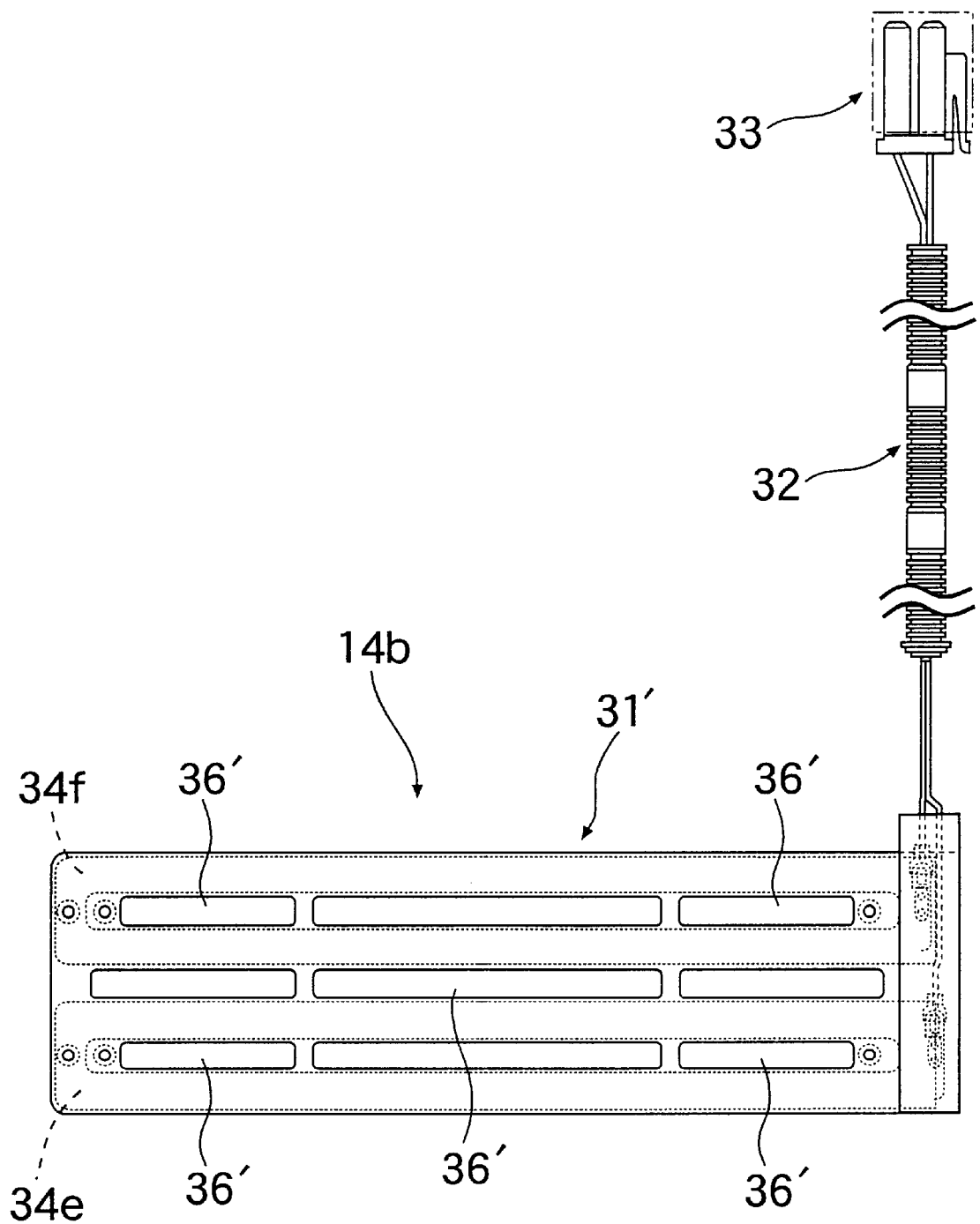
Figure 9:
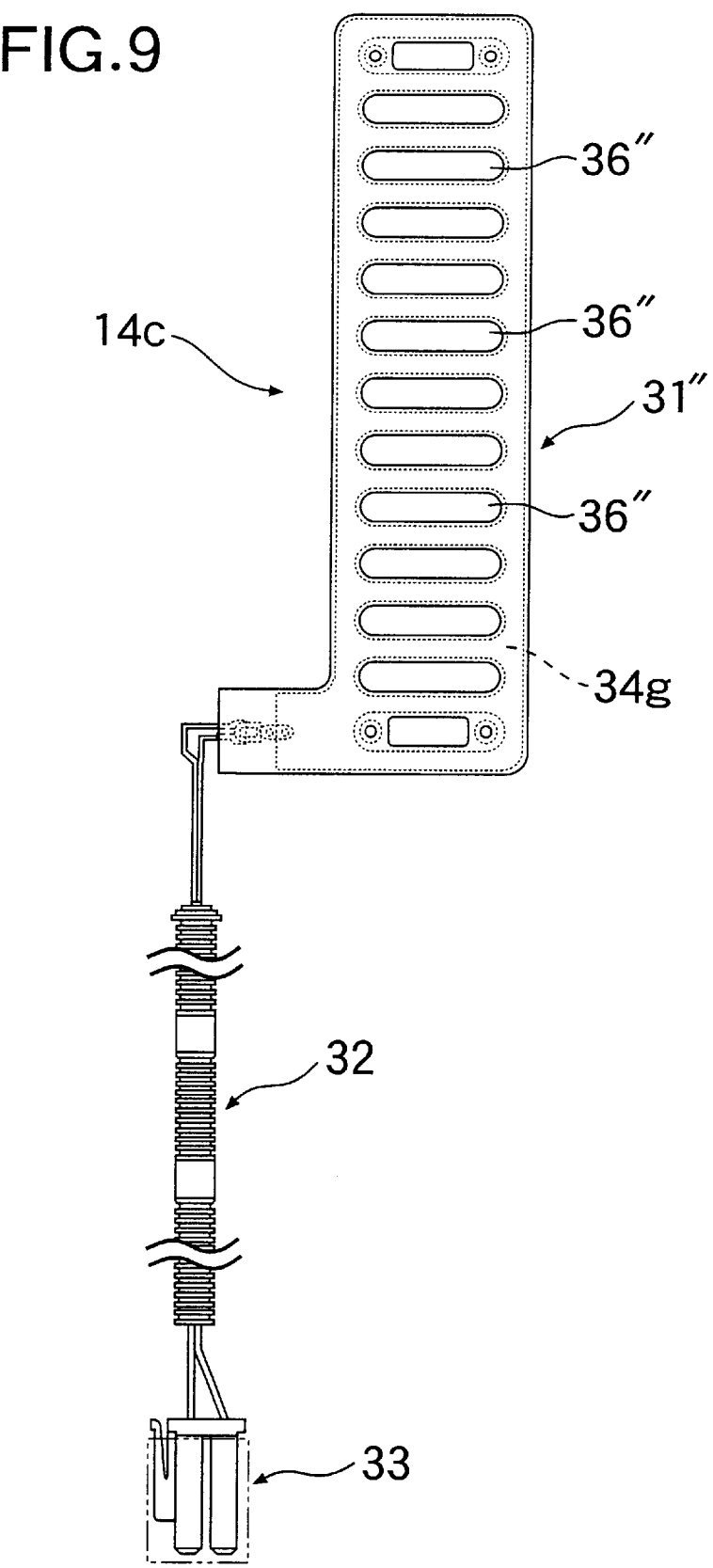

As apparent from FIGS. 8 and 9, each of the second and third sensors 14b and 14c is also comprised of a sensor body 31' or 31", a harness 32 and a connector 33, and has the same substantial structure as that of the first sensor 14a, except that the size of the sensor body 31' or 31" is different from that of the first sensor 14a. More specifically, the sensor body 31' of the second sensor 14b is smaller than the sensor body 31 of the first sensor 14a, and has two laterally extending antenna electrodes 34e and 34f disposed thereon at upper and lower two stages. The sensor body 31" of the third sensor 14c is smallest, and has a single antenna electrode 34g extending in the upward and downward direction.

Figure 7:
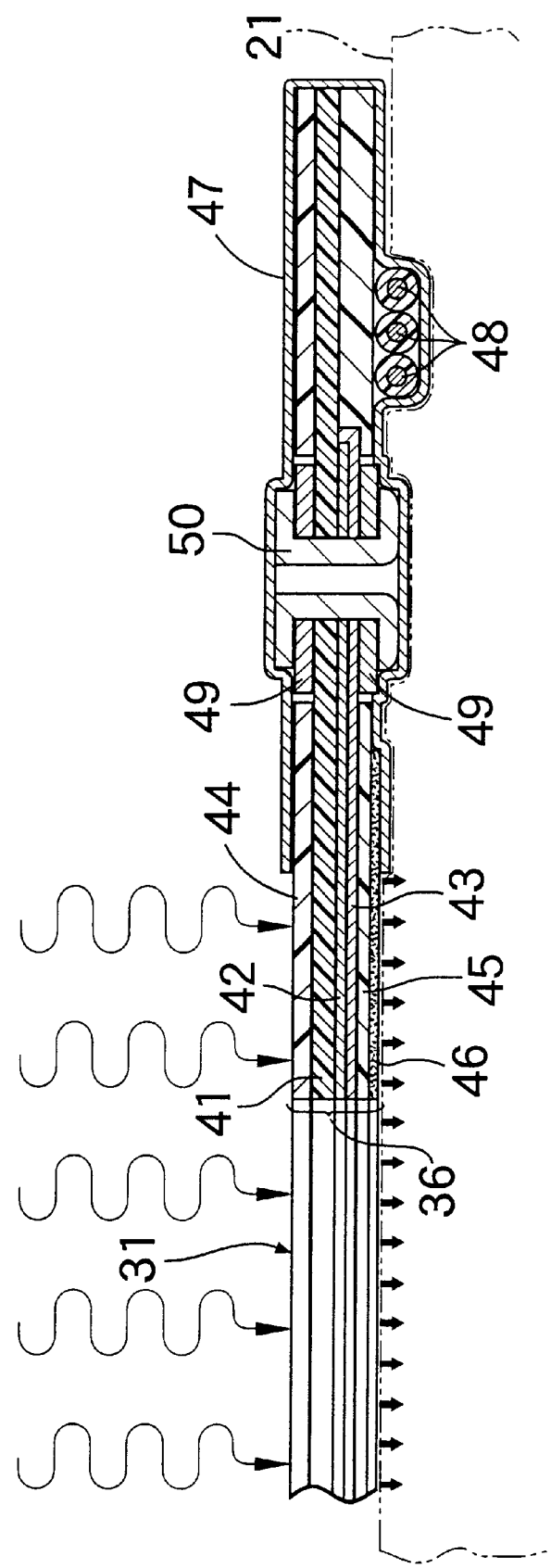

Next, the sectional structure of the sensor body 31, 31'31" of each of the first to third sensors 14a to 14c will be described below in detail with reference to FIG. 7. FIG. 7 shows the sectional structure of the sensor body 31 of the first sensor 14a, but the sectional structures of the sensor bodies 31', 31" of the second and third sensors 14b and 14c are the same as that of the sensor body 31 of the first sensor 14a.

An antenna film 41 serving as a base of the sensor body 31 is formed from a PET film (a polyethylene terephthalate film) having a thickness in a range of 50 µm to 100 µm. A first conductive layer 42 comprising, for example, an Ag layer (a silver layer) having a thickness in a range of 5 µm to 11 µm is printed in a patterned manner on a back surface of the antenna film 41, and further, a second conductive layer 43 comprising a C layer (a carbon layer) having, for example, a thickness in a range of 7 µm to 13 µm is printed in a patterned manner on a back surface of the first conductive layer 42. A first protective layer 44 comprising a resist paste layer formed, for example, of a flame-retardant synthetic resin and having a thickness in a range of 35 µm to 45 µm is printed in a patterned manner on a front surface of the antenna film 41, and a second protective layer 45 comprising, for example, a resist paste layer formed of a flame-retardant synthetic resin and having a thickness in a range of 7 µm to 17 µm is printed in a patterned manner on a back surface of the second conductive layer 43. A hot-melt film 46 having a thickness of about 100 µm is partially thermally welded and temporarily fixed to a back surface of the second protective layer 45. The hot-melt film 46 is melted by heating, and generates a strong adhesive force or bond when it is solidified by cooling. The hot-melt film 46 is melted by heating, and generates a strong adhesive force or bond when it is solidified by cooling. The film is formed of any appropriate hot-melt adhesive, and does not give off organic vapors when heated and cooled.

A twice-folded protective fabric 47 is adhered to front and back surfaces of one-side edge of the sensor body 31, and cords 48 of the harness 32 extending from the antenna electrodes 34a to 34d are fixed to the back surface of the second protective layer 45 by the protective fabric 47. The first and second protective layers 44 and 45 are notched at locations at which leading ends of the cords 48 are connected to the first and second conductive layers 42 and 43, and two washers 49 fitted in such notches are fixed by caulking an eyelet 50.

The first sensor 14a having the above-described structure is fixed to the seat back 12 in the following manner: The back surface of the hot-melt film 46 of the first sensor 14a is brought into abutment against the front surface of the wadding 21 previously adhered to and positioned on the pad 15 of the seat back 12 and then pressed while applying a heat of 200° C. or lower from the side of the front surface of the first sensor 14a. The hot-melt film 46 melted by the heating is then solidified by cooling, and the first sensor 14a is firmly fixed to the wadding 21 by an adhesive force generated at that time by the half-melt film.

In the same manner as is the first sensor 14a, the second and third sensors 14b and 14c are fixed to the front surfaces of the waddings 21 and 25 previously adhered to the pads 15 and 16 with the hot-melt films 46 interposed therebetween, respectively. The front surface of the seat back 12 is covered by the trim covers 18, 19 and 20 having the waddings 22, 24 and 26 previously adhered thereto.

As described above, the sensors 14a to 14c are formed by printing the first and second conductive layers 42 and 43 in the patterned manner on the antenna films 41 of PET each used as the base. Therefore, as compared with the conventional sensor comprising a conductive fabric adhered to a basic fabric, the manufacturing cost for the sensors can be extremely reduced. Also, the durability can be enhanced and moreover, the thickness of the sensors 14a to 14c can be reduced to alleviate any sense of incompatibility of the occupant sitting on the front passenger's seat 1. Further, since the opposite surfaces of the sensors 14a to 14c are covered with the first and second protective layers 44 and 45, the first and second conductive layers 42 and 43 can be protected from external forces, and the corrosion resistance of the first and second conductive layers 42 and 43 is enhanced.

In addition, the hot-melt film 46 is used to fix each of the sensor 14a to 14c to the front surface of the seat back 12. Therefore, the hot-melt film 46 can be melted to simply, firmly fix each of the sensors 14a to 14c to the seat back 12 in a short time by only positioning the sensors 14a to 14c at predetermined locations in the seat back 12 and heat-pressing them at a low temperature equal to or lower than 200° C. Additionally, there is not an undesirable influence to a working environment due to an organic solvent, which becomes a problem when a conventional adhesive is used, and there is also not a possibility of a reduction in quality due to variability in amount and position of adhesive applied. Further, problems are avoided such as a reduction in adhesive force at a high temperature caused when a double-coated adhesive tape or a double-adhesive applying treatment is employed, and a reduction in durability of chemicals in such adhesives.

Moreover, by temporarily welding the hot-melt film 46 to each of the sensors 14a to 14c in advance, the operability can be enhanced remarkably, as compared with a case where the hot-melt films 46 and the sensors 14a to 14c are superposed and positioned separately at predetermined locations in the seat back 12.

Figure 10:
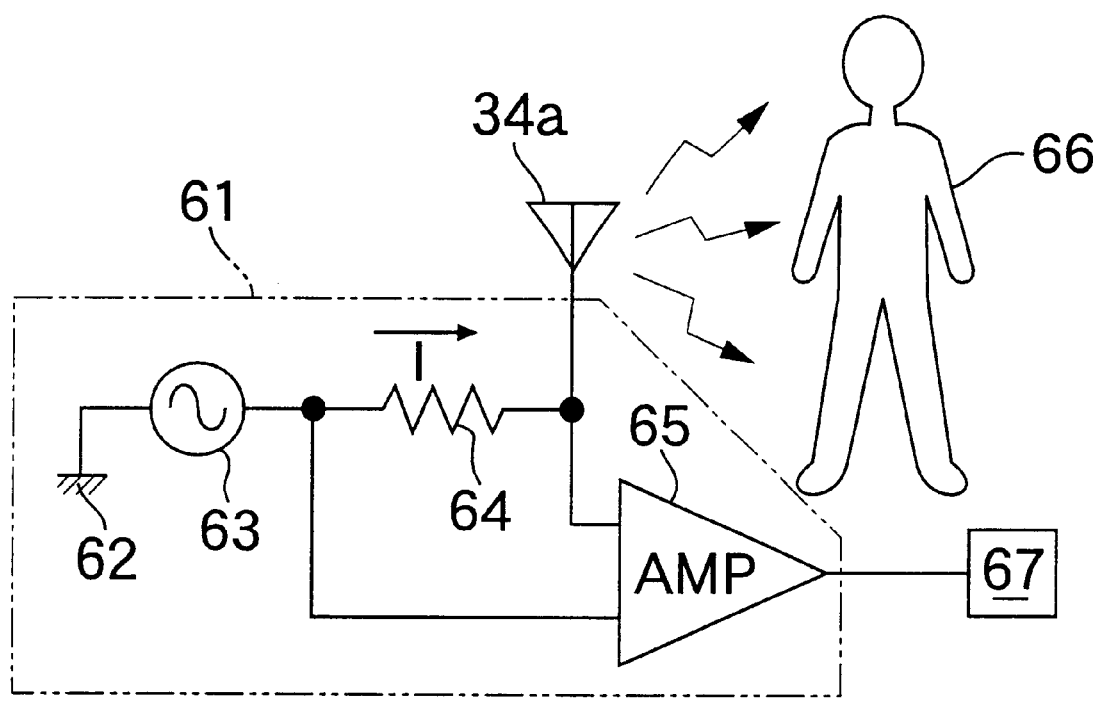

FIG. 10 shows a principle of detecting the physical constitution and attitude of an occupant sitting on the front passenger's seat 1 by the first to third sensors 14a to 14c. In an electric field output section 61, one end of 5 an electric field generating means 63 comprising a highfrequency generating circuit is grounded at a ground portion 62, and one end of a current monitor resistor 64 for converting an output current I from the electric field generating means 63 to a voltage and an amplifier 65 are connected to the other end of the electric field generating means 63. The other end of the current monitor resistor 64 is connected to the amplifier 65 and also connected, by turns at every predetermined time interval, to the seven antenna electrodes 34a to 34g of the first to third sensors 14a to 14c.

Figure 11:
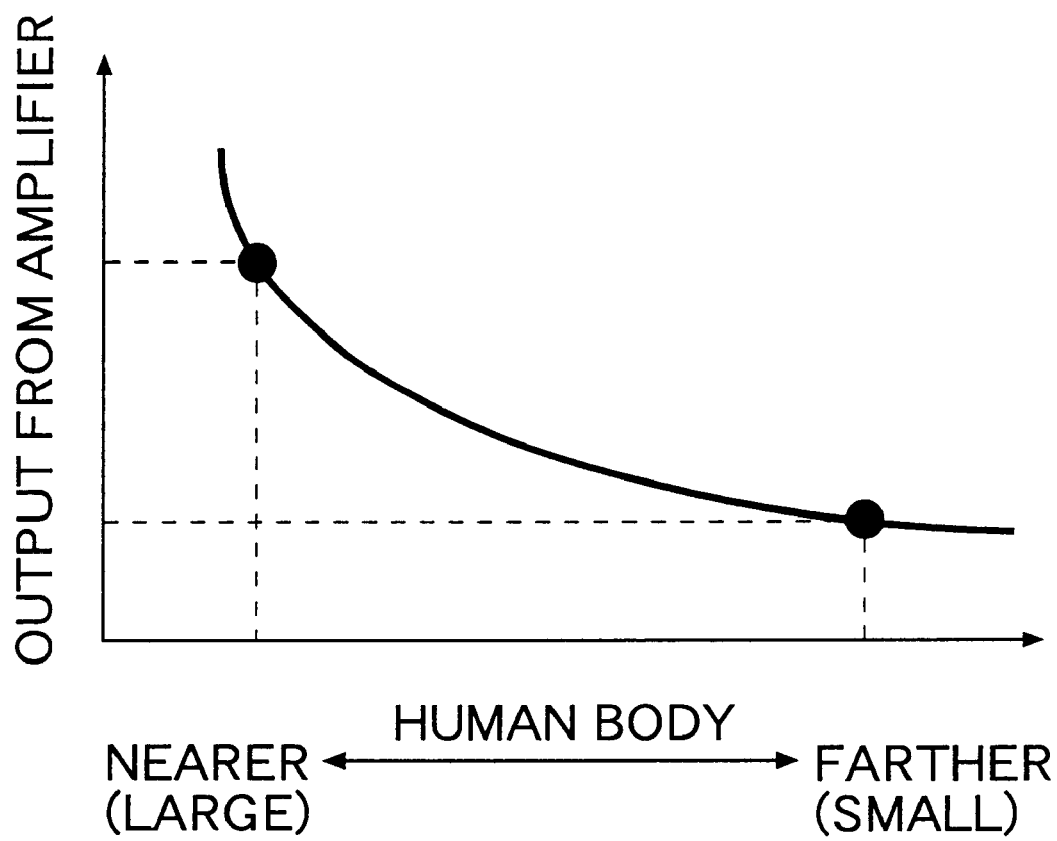

When there is no occupant sitting on the front passenger's seat 1 and hence, a human body 66, which is an inductor, is not close to one of the antenna electrodes 34a to 34g (e.g., the antenna electrode 34a) connected to the other end of the current monitor resistor 64, the value of an output current I generated by an electric field emitted from the antenna electrode 34a is extremely small in correspondence to a distance between the antenna electrode 34a and the ground portion 62 and a permittivity of air ($\in \approx 1$). As a result, a voltage generated at each of opposite ends of the current monitor resistor 64, i.e., an output from the amplifier 65 is also small. On the other hand, when the human body 66 having a large permittivity ($\in \approx 80$) as compared with air sits on the front passenger's seat 1, a large output current I corresponding to a distance between the antenna electrode 34a and the human body 66 and an area of the human body 66 opposed to the antenna electrode 34a flows across the current monitor resistor 64, and a voltage generated at each of the opposite ends of the current monitor resistor 64, i.e., an output from the amplifier 65 is also larger. FIG. 11 is a map or graph showing the output of the amplifier 65.

Therefore, the physical constitution of the occupant sitting on the front passenger's seat 1 can be detected by analyzing output patterns from the amplifier 65 corresponding to the six antenna electrodes 34a to 34f of the first and second sensors 14a and 14b in an occupant detection determining section 67. In addition, the system of the embodiment according to the invention can detect whether the occupant sitting on the front passenger's seat 1 is leaning toward the door 2 or not, based on an output from the amplifier 65 corresponding to the one antenna electrode 34g of the third sensor 14c. Thus, in a state in which a child sitting on the front passenger's seat 1 has fallen asleep with his or her body inclined toward the door 2, the deployment of the side air bag system 3 can be reliably prohibited.

Other embodiments of first, second and third sensors 14a, 14b and 14c will be described below with reference to FIGS. 12A, 12B and 12C.

Figure 12A:
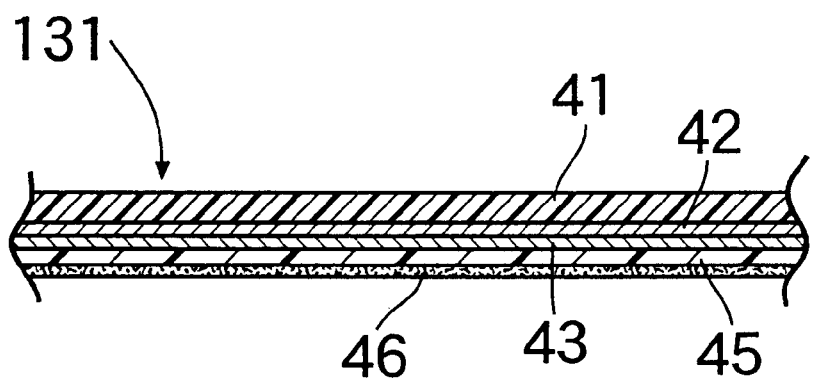
FIGS. 12A, 12B and 12C are illustrations showing other embodiments of sensors.

A sensor body 131 shown in FIG. 12A corresponds to the sensor body of the first embodiment, except that the first protective layer 44 is eliminated. The sensor body 131 shown in FIG. 12A has a five-layer structure comprising an antenna film 41, a first conductive layer 42, a second conductive layer 43, a second protective layer 45 and a hot-melt film 46, which are laminated one on another in sequence from a front side to a back side.

Figure 12B:
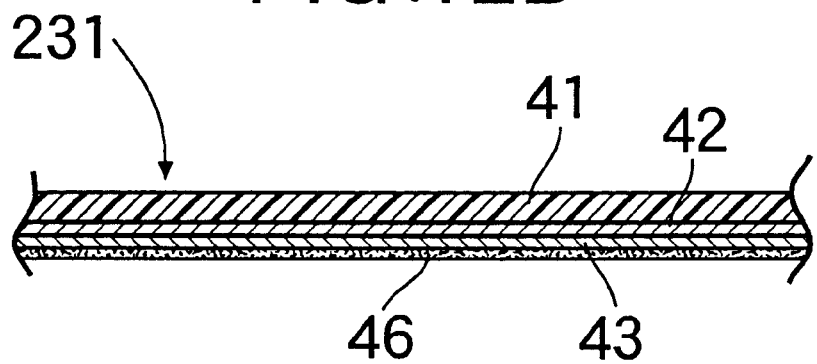

A sensor body 231 shown in FIG. 12B corresponds to the sensor body of the first embodiment, except that the first and second protective layers 44 and 45 are eliminated. The sensor body 231 shown in FIG. 12B has a four-layer structure comprising an antenna film 41, a first conductive layer 42, a second conductive layer 43 and a hot-melt film 46, which are laminated one on another in sequence from a front side to a back side.

Figure 12C:
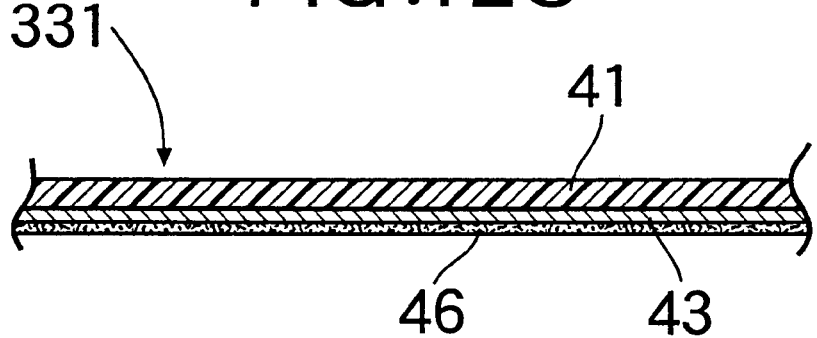

A sensor body 331 shown in FIG. 12C corresponds to the sensor body of the first embodiment, except that the first and second protective layers 44 and 45 and the first conductive layer 42 are eliminated. The sensor body 331 shown in FIG. 12C has a three-layer structure comprising an antenna film 41, a second conductive layer 43 and a hot-melt film 46, which are laminated one on another in sequence from a front side to a back side.

As described above, the antenna film 41 and at least one conductive layer are provided on the sensor body and hence, it is possible to allow each of the first to third sensors 14a to 14c to exhibit a basic function. The fixing of the first to third sensors 14a to 14c to the seat back 12 can be achieved easily and reliably by adding the hot-melt film 46 to the antenna film 41 together with at least one conductive layer.

Although the present embodiments of the invention have been described in detail above, it will be understood that the present invention is not limited to the above-described embodiments, and various modifications in design may be made without departing from the spirit and scope of the invention defined in claims.

For example, the thickness or the material for each of the antenna film 41, the first conductive layer 42, the second conductive layer 43, the first protective layer 44, the second protective. layer 45 and the hot-melt film 46 is not limited to that in each of the embodiments and can be varied properly.

What is claimed is:

1. An occupant detecting system comprising at least one sheet-shaped sensor fixed to a seat back to detect the sitting attitude and the physical constitution of an occupant, wherein said sensor is bonded to the seat back with a hot-melt film interposed therebetween.

2. An occupant detecting system according to claim 1, wherein said hot-melt film is temporarily bonded in advance to said sensor, and said sensor and said hot-melt film are then jointly fixed to said seat back by pressing said sensor and hot-melt film against said seat back, while heat is applied to said sensor.

3. An occupant detecting system according to claim 1, wherein said heat is applied to said sensor at temperatures of $\leq 200°$ C.

4. An occupant detecting system according to claim 1, wherein said sheet-shaped sensor comprises a conductive layer printed on the surface of a film material.

5. An occupant detecting system according to claim 4, further including a protective layer, and at least one of the surface of said film material and said conductive layer is covered with the protective layer.

6. An occupant detecting system according to claim 5, wherein said film material, said conductive layer, said protective layer and said hot-melt film are laminated together as a sheet-shaped sensor body.

7. An occupant detecting system comprising at least one sheet-shaped sensor fixed to a seat back to detect the sitting attitude and the physical constitution of an occupant, wherein said sensor comprises a conductive layer printed on a surface of a film material and a protective layer, at least one of the surface of said film material and said conductive layer is covered with said protective layer, and said sensor is bonded to the seat back with a hot-melt film interposed therebetween.

8. An occupant detecting system according to claim 7, wherein said film material, said conductive layer, said protective layer and said hot-melt film are laminated together as a sheet-shaped sensor body.

9. An occupant detecting system according to claim 7, further including another conductive layer, a pair of protective layers covering the surface of said film material and one of said conductive layers, respectively.

10. An occupant detecting system according to claim 9, wherein said film material, said conductive layers, and said protective layers are laminated together as a sheet-shaped sensor body.

11. A sheet-shaped sensor for being fixed to a seat back in an occupant detecting system, the sensor comprising: a sheet-shaped sensor body, and a hot-melt film bonded to a surface of said sensor body.

12. A sheet-shaped sensor according to claim 11, wherein said sensor body and said hot-melt film are jointly fixed to said seat back by pressing said sensor body and hot-melt film against said seat back, while heat is applied to said sensor body.

13. An occupant detecting system according to claim 12, wherein said heat is applied to said sensor body at temperatures of $\leq 200°$ C.

14. An occupant detecting system according to claim 4, wherein said conductive layer forms an electrode of said sheet-shaped sensor.

15. An occupant detecting system according to claim 5, wherein said protective layer is a permanent component of said sheet-shaped sensor.

16. An occupant detecting system according to claim 7, wherein said conductive layer forms an electrode of said sheet-shaped sensor.

17. An occupant detecting system according to claim 7, wherein said protective layer is a permanent component of said sheet-shaped sensor.

18. An occupant detecting system according to claim 11, wherein said sheet-shaped sensor is a laminated body and said hot-melt film bonds said sensor to the seat back.

* * * * *

UNITED STATES PATENT AND TRADEMARK OFFICE
CERTIFICATE OF CORRECTION

PATENT NO.    : 6,424,268 B1
DATED         : July 23, 2002
INVENTOR(S)   : K. Isonaga et al.

It is certified that error appears in the above-identified patent and that said Letters Patent is hereby corrected as shown below:

Column 1,
Line 26, change "sing" to -- using --.

Column 5,
Line 57, delete "5".
Line 58, change "highfrequency" to -- high-frequency --.

Column 6,
Lines 9 and 13, change "∈" to -- ε --.

Column 7,
Line 13, delete the period.

Signed and Sealed this

Eighteenth Day of February, 2003

JAMES E. ROGAN
*Director of the United States Patent and Trademark Office*